US012706761B2

(12) United States Patent
Guilley et al.

(10) Patent No.: US 12,706,761 B2
(45) Date of Patent: Aug. 11, 2026

(54) ADAPTIVE CONTROL SYSTEM OF A CONFIGURABLE STRONG PUF SOURCE

(71) Applicant: SECURE-IC SAS, Cesson-Sévigné (FR)

(72) Inventors: Sylvain Guilley, Paris (FR); Florent Lozac'h, Servon-sur-Vilaine (FR)

(73) Assignee: SECURE-IC SAS, Cesson-Sévigné (FR)

( * ) Notice: Subject to any disclaimer, the term of this patent is extended or adjusted under 35 U.S.C. 154(b) by 1 day.

(21) Appl. No.: 18/792,303

(22) Filed: Aug. 1, 2024

(65) Prior Publication Data

US 2025/0055711 A1 Feb. 13, 2025

(30) Foreign Application Priority Data

Aug. 10, 2023 (EP) .................................... 23190950

(51) Int. Cl.
*H04L 9/32* (2006.01)
*H04L 9/08* (2006.01)

(52) U.S. Cl.
CPC .......... *H04L 9/3278* (2013.01); *H04L 9/0891* (2013.01)

(58) Field of Classification Search
CPC ............................ H04L 9/3278; H04L 9/0891
USPC .......................................................... 380/277
See application file for complete search history.

(56) References Cited

U.S. PATENT DOCUMENTS 8,867,739 B2 10/2014 Danger
10,630,492 B2 * 4/2020 Guilley .................... G09C 1/00
10,855,476 B2 12/2020 Dafali et al.
11,005,668 B2 * 5/2021 Danger ................. H04L 9/3278
12,052,355 B1 * 7/2024 Sehrawat .............. H04L 9/0825
2009/0083833 A1 * 3/2009 Ziola ..................... H04L 9/3278 726/2
2011/0055649 A1 * 3/2011 Koushanfar ............. G09C 1/00 714/729
2020/0210628 A1 * 7/2020 Karpinskyy .......... H04L 9/0866
(Continued)

FOREIGN PATENT DOCUMENTS

CN 103 020 552 A 4/2013
EP 3 454 319 B1 11/2022

OTHER PUBLICATIONS

"Information security, cybersecurity and privacy protection—Physically unclonable functions", ISO/IEC 20897, First Edition, 2022.

(Continued)

*Primary Examiner* — Dereena T Cattungal
(74) *Attorney, Agent, or Firm* — BakerHostetler

(57) ABSTRACT

An adaptive control system of a configurable strong PUF source configured to deliver a self-enrollment status, a key (K) and a key rebuilding status, including an adaptive PUF control unit configured to: receive information of entropy of at least one key, reliability of the at least one key and PUF index representative of one of the at least one key; challenge and configure the strong PUF source; and receive a quantized non-binary response in feedback of the strong PUF source; a PUF control logic finite state machine configured to drive the adaptive control unit, configured to: receive a PUF mode operation to execute, first self-enrollment, then key rebuilding; access to data representative of one-time programmable policy; write and read data of a data RAM; write and read a one-time programmable data.

7 Claims, 10 Drawing Sheets

(56) References Cited

U.S. PATENT DOCUMENTS

| | | | | |
|---|---|---|---|---|
| 2023/0004681 | A1* | 1/2023 | Suresh | G06F 21/75 |
| 2024/0201256 | A1* | 6/2024 | Noh | H04L 9/0866 |
| 2024/0372736 | A1* | 11/2024 | Seidl | G06F 21/57 |
| 2025/0005206 | A1* | 1/2025 | Fang | H04L 9/0866 |
| 2025/0038999 | A1* | 1/2025 | Wu | G09C 1/00 |

OTHER PUBLICATIONS

Pour, et al., "PUF Enrollment and Life Cycle Management: Solutions and Perspectives for the Test Community", 2020 IEEE European Test Symposium (ETS), 2020.

Danger, et al., "PUFs: Standardization and Evaluation", 2016 Mobile System Technologies Workshop (MST), pp. 12-18, 2016.

Extended European Search Report issued in European Patent Application No. EP 23190950.8, mailed Jan. 23, 2024.

Anik, et al., "Testing and reliability enhancement of security primitives: Methodology and experimental validation", Microelectronics Reliability, vol. 147, Aug. 2023.

Maes, "Physically Unclonable Functions: Constructions, Properties and Applications", PhD manuscript, Aug. 2012.

Shaub, et al., "The Big Picture of Delay-PUF Dependability", ECCTD 2020, pp. 1-4, Sep. 2020.

"OTP-PUF—Tamperpoof storage" (Data protection from safeguarded anti-fuse OTP memory, Mar. 2024. https://www.pufsecurity.com/products/secure-otp/).

Ruhrmair, et al., "PUF Modeling Attacks on Simulated and Silicon Data", IEEE Transactions on Information Forensics and Security, vol. 8, No. 11, Nov. 2013.

Jedec Standard, "Temperature, Bias, and Operating Life", Jedec Standard, JEP122H, JESD22-A108G, Nov. 2022.

Lubicz, et al.,"Towards an Oscillator Based TRNG with a Certified Entropy Rate", IEEE Trans. Computers, 64(4), 2014.

Rukhin et al., "A Statistical Test Suite for Random and Pseudorandom Number Generators for Cryptographic Applications", NIST, SP 800-22, section §4 of SP 800-22 Rev. 1a, Apr. 2010.

Schaub, et al., "An Improved Analysis of Reliability and Entropy for Delay PUFs", 2018 21st Euromicro Conference on Digital System Design (DSD), 2018.

Jedec Publication, "Failure Mechanisms and Models for Semiconductor Devices", JEP122H, Jedec Solid State Technology Association, 2016.

Ruhrmair, et al., "Modeling Attacks on Physical Unclonable Functions", CCS '10: Proceedings of the 17th ACM conference on Computer and communications security, 2010.

Information obtained from a website. "VIA-PUF Security Chip for Root of Trust", Design and Reuse, Jul. 4, 2022, [retrieved on Aug. 22, 2024]. Retrieved from the Internet: https://www.design-reuse.com/sip/via-puf-security-chip-for-root-of-trust-ip-51118/t-ip-51118/•.

Jouini, et al., "An Easy-to-Design PUF based on a Single Oscillator: the Loop PUF", 2012 15th Euromicro Conference on Digital System Design, 2012.

* cited by examiner

| Life cycle state | | Modes of operation | | | Comment |
|---|---|---|---|---|---|
| Number | Name | Health Test | Self-Enrollment | Key Rebuilding | |
| 0 | BLANK | ✓ | ✓ | ✓ | Everything can be tested |
| 1 | FACTORY | ✓ | ✓ | ✗ | Meant for getting ready |
| 2 | PROVISIONED | ✓ | ✗ | ✓ | Enrolled, before going to market |
| 3 | MISSION | ✓ | ✗ | ✓ | Used to generate key in mission |
| 4 | RETURN MATERIAL AUTHORIZATION (RMA) | ✓ | ✗ | ✗ | Used to diagnose issues |
| 5 | END OF LIFE (EOL) | ✗ | ✗ | ✗ | Decommissioning |

FIG.4

| Advantage | Description |
|---|---|
| Reliability – differential key extraction | PUF responses can be volatile in various environments, which is mitigated by design leveraging differences (removing the "common mode" from the measurements) |
| Reliability – rebuild time | Decision for bits when discretizing can leverage the LLN (Law of Large Numbers), i.e., the mean quadratic error in an estimation decreases with the number of repetitions |
| Entropy – generation of multiple keys from a single PUF entropic element | The adaptive control can select wisely (according to a stochastic model) the challenges to submit to the PUF entropy source, thereby making it possible to generate more than one key |
| Security – randomization | The sequence of queries can be made unpredictable, such that an attacker empowered with the capability to measure a side-channel cannot exploit his advantage |
| Security – resistance to helper data manipulation | The helper data can be encoded in terms of quartiles according to independent binnings, which ensures that helper data manipulation yields no information whatsoever to attackers. |

FIG.9

| Configuration | Helper data | Rebuild time |
|---|---|---|
| **Global** | Smaller | Larger (worst case) |
| **Per challenge** | Larger | Smaller |

FIG.10

ADAPTIVE CONTROL SYSTEM OF A CONFIGURABLE STRONG PUF SOURCE

CROSS-REFERENCE TO RELATED APPLICATION

This application claims priority to foreign European patent application No. EP 23190950.8, filed on Aug. 10, 2023, the disclosure of which is incorporated by reference in its entirety.

FIELD OF THE INVENTION

The invention generally relates to Physically Unclonable Functions (designated hereinafter by the acronym PUF).

BACKGROUND

PUFs are objects that are unique per device although being obtained by manufacturing from the same design representation. Some PUFs have been introduced that leverage the repartition of impurities spread inside of bulk material, whose spatial distribution is basically set at random (without any way whatsoever to predict their position) during fabrication process. In order to recognize one PUF amongst others, a laser beam is used to penetrate the material and to scan it (emitted light reflection will be innate to this device). In this respect, such "analog" PUF is dubbed "optical PUF".

When used in a context of securing objects (e.g., ensuring a unique ID to allow per device service, or for derivation of a cryptographic key to manage chip's secrets), PUFs are untamperable. This is for instance the case of the optical PUF, because attempts to alter the position of the impurities most likely change the position of properties captured within the material at all. Therefore the PUF is merely destroyed by this manipulation and subsequently no longer recognized as genuine.

A special category of PUFs of particular interest is the "silicon PUF". Such PUFs can be integrated as a piece of logic within an electronic circuit, and are therefore known as "silicon PUFs". In the sequel, we will focus our attention on them since they can serve as building blocks deeply integrated into sensitive "digital" electronic designs.

In particular, it is customary to model the core of the PUF as a Boolean function, which takes an input one word (a bit-string) and outputs one bit (Output of a single PUF entropic element is one bit, in general. Recently, the concept of High-order Alphabet (HoA) for PUFs has been proposed in "Testing and reliability enhancement of security primitives: Methodology and experimental validation, Microelectronics Reliability, Volume 147, August 2023.", de Md Toufiq Hasan Anik, Jean-Luc Danger, Omar Diankha, Mohammad Ebrahimabadi, Christoph Frisch, Sylvain Guilley, Naghmeh Karimi, Michael Pehl and Sofiane Takarabt. In this case, one query to the PUF yields multiple bits of response.). This structure can subsequently be instantiated or queried multiple times to extract a full-length key, say comprising n=256 bits.

Thus it is customary to view each instance of the silicon PUF as a random function, which takes as input challenges and generate as output responses. Recall that a "random function" is a deterministic function, which though differs for each individual instance.

PUFs are used in varied contexts. Owing to their innate anti-tampering property, they are thoroughly leveraged in general for security-critical applications. One such use-case is the secure-boot, where the device master key ensuring device protection is obtained from the PUF prior to booting the platform. In this respect, it is clear that the PUF shall rebuild a key without error (ideally) and ensure that the key is indeed unique per device (hence of maximal entropy). Another use-case is that of untamperable chip identification. The PUF delivers a unique per chip identity (nicknamed "ID"), which can be neither forged at design time nor be replaced in mission mode.

Owing to this multiplicity of use-cases, PUFs must behave correctly not only in the anticipated environmental conditions, but also under adversarial conditions (i.e., when an attacker does not play by the rules). The first case is that of operation within corners (which are representation as PVTA conditions, short for Process, Voltage, Temperature and Aging). The PUF shall work as per specification whatever the quality of its manufacturing, and whatever its environmental conditions, in terms of Voltage and Temperature (at least that allowed by corners definition). Same accounts for the Aging: the PUF shall know how long it is expected to live. The second case corresponds to situations whereby an attacker intentionally alters the environmental conditions in order to gain an advantage from the faulty environment (maybe beyond the allowed corners). It is therefore important for a first-class citizen PUF to perform "sanity checks", also referred to as "health tests".

Several PUF principles have been disclosed in the scientific literature. It is however admitted that PUFs can be broadly classified into two categories, as in "Physically Unclonable Functions: Constructions, Properties and Applications", PhD manuscript by Roel Maes, Department of Electrical Engineering (ESAT) at KUL (Belgium): (1) So-called weak PUFs generate precisely one key, whereas (2) so-called strong PUFs have the ability to generate a larger number of responses. Therefore, strong PUFs can be considered as a superset of weak PUFs. Namely, strong PUFs addressable by n-bit challenges can generate two elevated to the power n (i.e., 2n) response bits (exponential increase). Therefore, in the state of the art, weak PUFs usually generate keys (bit-vectors) by spatial instantiation of several PUFs, whereas strong PUF designs usually generate keys by temporal redundancy, meaning that each bit is generated as a response to a different challenge. However, regarding strong PUFs, two restrictions shall be noted. First of all, the total entropy of strong PUFs is bounded, namely less than 2n as it is expected there exists some interrelationship between responses. Second, it shall be noted that some sorts of strong have been defeated in theory and in practice by attackers exploiting "machine learning" (ML) techniques. Indeed, the richness of strong PUFs can turn out to be weaknesses, if the attacker can use their flexibility to learn them.

Still, it is known that strong PUFs can be operated in such a way that users (i.e., prospective attackers) cannot submit arbitrary challenges to them, which effectively mitigates machine learning attacks.

Besides, we are interested in strong PUFs which produce a non-binary response. This allows for online measurement of reliability. In the sequel, we consider such PUFs, as illustrated on FIG. 1, where the analog output is quantized (thanks to an analog-to-digital conversion, also abridged ADC), to a value that is not binary. For instance, the ADC can be a counter. Therefore, models can be checked at an upper level, e.g., by counting loops in PUFs based on free-running oscillators. It is also known as "soft decision" (based on one multivalued variable), contrasted to "hard decisions" (based on one binary variable).

One known benefit of such strong PUFs is that their rationale can be abstracted under the form of a so-called "stochastic model". As explained in the next paragraph, a stochastic model allows to derive PUF metrics from measurable parameters. Notice that weak PUFs unfortunately do not enjoy stochastic models as they have no input parameters to impact their metrics. Therefore, weak PUFs can happen to have insufficient metrics without the flexibility to make up actively for their potential insufficiencies. Weak PUFs metrics are "as is", hence some chips will be less good than others, and even some chips won't even be suitable for operational use, and a costly triage should be operated (unless living with average metrics is considered tolerable).

Notice that in the sequel, we shall consider two emblematic PUFs: the SRAM PUF ("Physically Unclonable Functions: Constructions, Properties and Applications", PhD manuscript by Roel Maes, Department of Electrical Engineering (ESAT) at KUL (Belgium), § 2.4.4 "SRAM PUF") representing weak PUFs (the key spawns spontaneously in SRAM after power-up), and a delay PUF, such as the Loop-PUF ("An Easy-to-Design PUF Based on a Single Oscillator: The Loop PUF". DSD 2012:156-162, p4), representing strong PUFs. The SRAM PUF is only mentioned in this document to contrast with strong PUFs. From FIG. 1, it can be seen that SRAM PUF are atomic (top), whereas loop-based PUFs (bottom) can be broken up into several sub-blocks.

FIG. 1 illustrates Strong PUF with digital output (after the Analog-to-Digital Converter block), used as a quantized (i.e. digitized, multibit) though not binary value. Quantized multivalued responses allow to build histograms and therefore deduce statistics It is therefore evident that PUFs shall be rated according to some objective figures of merit. One normative document in this respect is, "Information security, cybersecurity and privacy protection-Physically unclonable functions", ISO/IEC 20897. Irrespective of the PUF design rationale, what matters to the end user is encompassed by two metrics, namely "reliability" and "entropy". Reliability relates to proper rebuilding of one single instance, whereas entropy relates to the independence of PUFs across different instances.

One pragmatic way to apprehend these constraints is as per the following two properties, as in "The Big Picture of Delay-PUF Dependability", Alexander Schaub, Jean-Luc Danger, Olivier Rioul, Sylvain Guilley, ECCTD 2020:1-4:

Intra-PUF: responses must be identical, and measured for instance by a "bit error rate" BER or a "key error rate" KER, which is a BER on the n bits making up the key; These quantities relate to a notion of "Signal to Noise Ratio" SNR, which is the ratio between the technological dispersion (local variability) and the variance of the unpredictable noise that degrades the measure of the dispersion.

Inter-PUF: responses must be different, and measured for instance by some entropy tool borrowed from the information-theory kit. On delay strong PUFs, it can be related to a particular choice of challenges (typical, pairwise orthogonal challenges belonging to a Hadamard code).

A structural problem of the PUF is that, by design, responses under some challenges are not reliable. This is bound to happen, because PUFs take their randomness from technological dispersion, which is a defect not bound to happen. This means that technological dispersion is, in average, "none". Usually, technological dispersion is perceived as a curse of the technology, which makes its performances less predictable: it forces design kits to be more conservative (e.g., enforcing derating factors) and results in production yield decreases. But for PUFs, technological dispersion is the working factor. Clearly, for a PUF to be reliable, challenges leading to unreliable responses shall be ruled out. The list of eliminated challenges belongs to the category of "pre-trained" information (stored permanently), which in general is referred to as the "helper data".

Notice that operating a PUF without helper data is possible (PUFs operating without helper data do exist, but with limited reliability (or with given reliability at the expense of a lengthier than usage rebuilding operation), which allows to spare many issues related to the enrollment procedure (no need for device-level enrollment, only class-level is needed). However, in general, to reach reasonable metrics in reasonable times, PUFs shall be characterized "one by one". This step is called the "enrollment", and is commented next.

The state-of-the-art literature discussing PUFs often focuses attention on the "PUF entropy source". However, a PUF source alone does not fulfill today's needs. Indeed, several tests and checks shall be carried out before leveraging the PUF entropy source. In this respect, a PUF is comprised of several ancillary functions, including fabrication tests, health tests, codes to improve the reliability and the entropy, including non-volatile memory to store helper data. Health tests consists in self-checks to assert the proper functioning of the PUF. Clearly, such functions are instantiated to make up for "PUF entropy source alone" drawback. It is thus apparent that one major deficiency of today's PUF market is its involvement in a dynamic usage. Indeed, today, the default PUF usage is "single shot", namely to have it rebuild a key statically upon power-up and then to subsequently deny any further services.

Let us finally notice that several attacks have been published about attacks on the PUF, such as key recovery leveraging "chosen helper data" and "side-channel attacks". Those attacks must be mitigated in the context of a highly secure product.

Current PUF technologies have numerous shortcomings, owing to the static nature of their use-case. We enumerate the list of shortcomings below, but we would like to clarify the reason for the limitations. The weak PUFs such as that based on SRAM state "showing up" at power-up ("Physically Unclonable Functions: Constructions, Properties and Applications", PhD manuscript by Roel Maes, Department of Electrical Engineering (ESAT) at KUL (Belgium), § 2.4.4 "SRAM PUF", p. 41) are intrinsically limited to one measurement per power-up cycle, by the "static" nature of SRAM memory (For instance, the documentation of one industrial solution ("bring-up of Intrinsic ID PUF inside of Intel/Altera FPGAs) of weak PUF. Excerpt: "To enroll the PUF, you must use the SDM provision firmware. The provision firmware must be the first firmware loaded after a power cycle, and you must issue the PUF enrollment command before any other command. The provision firmware supports other commands after PUF enrollment, including AES root key wrapping and programming quad SPI, however, you must power cycle the device to load a configuration bitstream.").

This limitation is shared across all weak PUF avatars, such as "dielectric breakdown PUF", "Via-PUF" (Via-PUF Security Chip for Root of Trust, https://www.design-reuse.com/sip/via-puf-security-chip-for-root-of-trust-ip-51118/), "OTP-PUF" (Data protection from safeguarded anti-fuse OTP memory. https://www.pufsecurity.com/products/secure-otp/), etc. The power-up value is authoritative. Quite suprizingly, the strong PUFs (as presented in state-of-the-art literature) face the same limitations because nobody actually have tried to bypass them. Therefore they are suitable for being the core "entropy source" of this invention. The applications will be all the more relevant as entropy source is configurable, which is not necessarily the case of all existing strong PUFs.

Today, enrollment of weak PUFs requires several power on/off cycles. Indeed, the reliability of a particular element of the entropy source can only be assessed based on repeated measurements. There is therefore an obvious tradeoff, between enrollment time vs reliability/entropy. Notice that not only an accurate estimation requires several (hundreds or even thousands) of PUF queries, but also testing in all PVTA corners agreed upon is demanding. We underline that it would require (if effectively done-probably a step sacrificed for performance/cost issues) a long period of interaction time with the test equipment.

Helper data allow to improve the PUF reliability. However, it has been shown that if an attacker can surreptitiously change the helper data, then information on the PUF (random) function can be recovered. Thus, as of today, the state-of-the-art is to perform enrollment and to store the result (the "helper data") securely in terms of integrity (since PUF value is obviously amenable to attacks). This needs for enrollments to happen in "secure premises" (Ulrich Rührmair, Jan Sölter: PUF modeling attacks: An introduction and overview. 2014:1-6). Secure premises are a costly requirement. For instance, this can be fulfilled with a Common Criteria (CC) certified site, which entails to comply to Minimum Site Security Requirements (MSSR). Also, in case the enrollment is carried out by a third party, this condition limits the number of possible subcontractors, whereby impacting negatively the cost and the time of the enrollment service.

The usual way to operate the PUF is to set it up once for all, in a secured facility. In other words, it is almost considered as a requirement that, once enrolled, a PUF becomes immutable. However, this precludes many innovative use-cases whereby the PUF is re-enrolled at any time This rigidity is an obvious drawback in that the product can no longer be used if compromised. Certification context blames such behavior: for instance, NIST FIPS SP 800 193 requires devices security settings to be ever-green. Now, in general, products are designed in a "future-proof" manner, which should make it very unlikely to experiment a forced transition to "end-of-life" life cycle finite state machine code change.

Assuming the need for a soft reboot or re-derivate the PUF value for any reason, state-of-the-art PUFs are not designed to support this capability. Now, it can be a "must have feature", for instance safety applications must consider to have such a "warm" reboot in case alarms are raised and the policy decides for iSE restart. A "warm" reboot happens with the power being cut and even without resetting the whole chip.

Some security standards (e.g., NIST FIPS 140-3) require that any function be tested before use and also periodically. Some test procedures, such as High-Temperature Operating Life (JEDEC STANDARD, JESD22-A108G.

Temperature, Bias, and Operating Life. November 2022; JEDEC STANDARD, JEP122H. Failure mechanics and models for semiconductors devices. September 2016.) consist in running the chip in degraded conditions to simulate accelerated aging. These HTOL dynamic tests require the capability to address the chip (in our case the PUF) without power-down for a long period of time. The state-of-the-art PUFs spawn a value upon power-up and remain stuck with this value, hence fail to comply with aforementioned standards. At the opposite, our PUF has the capability to be functionality tested and even better, to be tested from a security standpoint (see for instance documents U.S. Pat. No. 10,855,476B2 or U.S. Pat. No. 10,630,492B2.

The proposed solution allows to solve the aforementioned problems by offering the following services/operations, namely:

- health tests (abridged HT), which can be run anytime to verify that the PUF is not weared out or has not been attacked;
- self-enrollment (abridged SE), a prerequisite operation before reliable key rebuilding can be executed;
- Key rebuilding (abridged KR), including possibly several re-rebuilding within one power-up cycle.

SUMMARY OF THE INVENTION

It is proposed, according to one aspect of the invention, an adaptive control system of a configurable strong PUF source configured to deliver a self-enrollment status, a key and a key rebuilding status, comprising: an adaptive PUF control unit configured to:

- receive information of entropy of at least one key, reliability of the at least
  - one key and PUF index representative of one of the at least one key; challenge and configure the strong PUF source; and
  - receive a quantized non-binary response in feedback of the strong PUF source;
- a PUF control logic finite state machine configured to drive the adaptive control unit, configured to:
  - receive a PUF mode operation to execute, first self-enrollment, then key rebuilding;
  - access to data representative of one-time programmable policy;
  - write and read data of a data RAM; and
  - write and read a one-time programmable data.

In one embodiment, the PUF control logic finite state machine is configured to:

Access data RAM to make a repeated data collection of challenges/responses leveraging the data RAM for accumulations;

- if PUF mode operation received is self-enrollment, select the most reliable challenges having a reliability greater than a reliability threshold, deliver a self-enrollment status taking the value good or bad depending on whether the self-enrollment went successfully or not, according to the corresponding reliability being greater than the reliability threshold and the corresponding entropy being greater than an entropy threshold, and write whitelisted challenges having a good self-enrollment status in the one-time programmable data; and
- if PUF mode operation received is key rebuilding, read the whitelisted challenges in the one-time programmable data, apply all whitelisted challenged, decide the key bits using adaptive control by querying the strong bit until the entropy and reliability thresholds are surpassed, deliver a key rebuilding status taking the value good or bad depending on whether the self-enrollment went successfully or not, and deliver a key.

In one embodiment, the PUF control logic finite state machine is also configured to:

- if PUF mode operation received is health tests, estimate the reliability and the entropy of the at least one key, and deliver a health tests status taking the value good or bad depending on whether health tests are successful or not.

In one embodiment, the one-time programmable data contain:

a whitelist per PUF instance;

entropy and reliability thresholds; and a life cycle for each PUF.

In one embodiment, the one-time programmable data contain a life cycle for each PUF, including whether the PUF is enrolled.

According to another aspect of the invention, it is also proposed a method to deliver a self-enrollment status, a key and a key rebuilding status, the method being implemented by an adaptive control system of a strong PUF source, the method comprising:

receiving information of entropy of at least one key, reliability of the at least one key and PUF index representative of one of the at least one key;

challenging and configure the strong PUF source; and receiving a quantized non-binary response in feedback of the strong PUF source;

implemented in an adaptive PUF control unit, and the method comprising:

receiving a PUF mode operation to execute, first self-enrollment, then key rebuilding;

accessing to data representative of one-time programmable policy;

writing and reading data of a data RAM;

writing and reading a one-time programmable data;

implemented in a PUF control logic finite state machine configured to drive the adaptive control unit.

According to another aspect of the invention, it is also proposed a computer program product comprising instructions for carrying out the steps of the method above described.

BRIEF DESCRIPTION OF THE DRAWINGS

The invention will be better understood on studying a few embodiments described by way of non-limiting examples and illustrated by the accompanying drawings in which:

FIG. 4 schematically illustrates an example of typical authorization for modes of operations, based on life cycle states, according to an aspect of the invention;

FIG. 9 schematically illustrates a table of the benefits of using adaptive control, according to an aspect of the invention; and FIG. 10 schematically illustrates the flexibility in helper data derivation, according to an aspect of the invention.

DETAILED DESCRIPTION

In all of the figures, the elements having identical references are similar.

Figure 1:
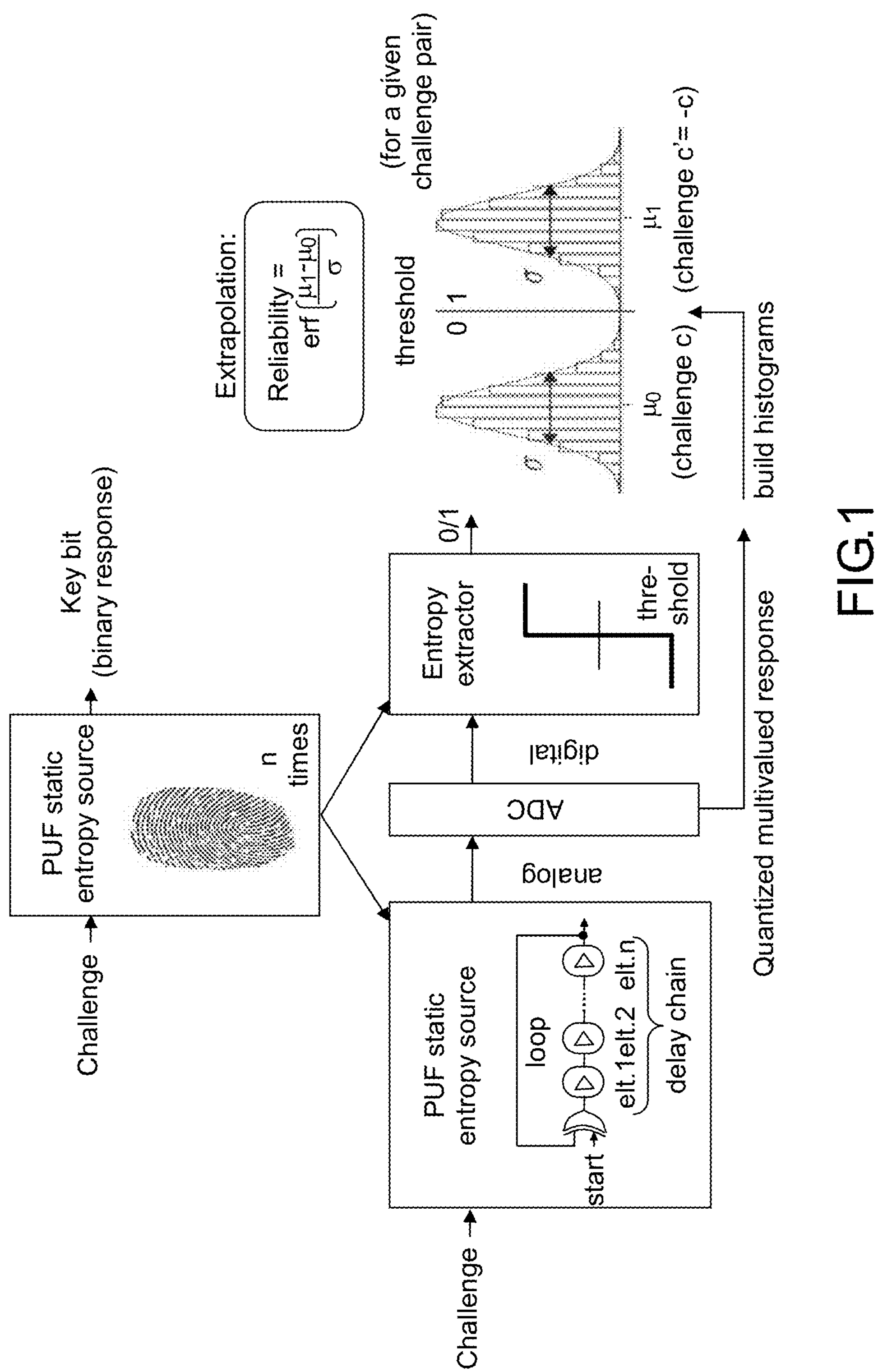
FIG. 1 schematically illustrates a Strong PUF with digital output, according to the state of the art.
Figure 2:
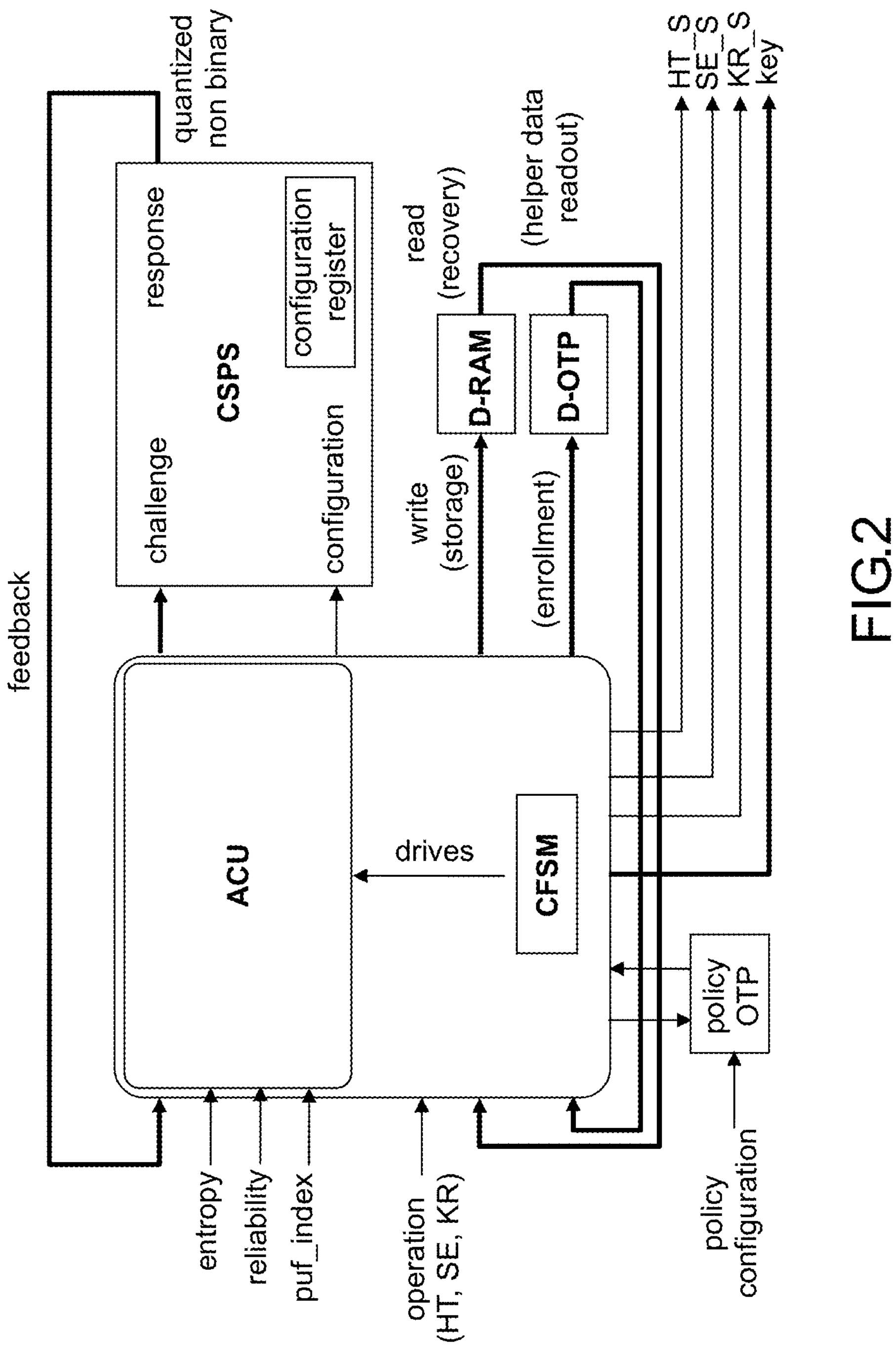
FIG. 2 schematically illustrates an adaptive control system of a configurable strong PUF source, according to an aspect of the invention.

FIG. 2 schematically illustrates an adaptive control system of a configurable strong PUF source, according to an aspect of the invention.

An adaptive control system of a configurable strong PUF source CSPS configured to deliver a self-enrollment status SE_S, a key K and a key rebuilding status KR_S, comprises:

an adaptive PUF control unit ACU configured to:

receive information of entropy of at least one key, reliability of the at least one key and PUF index representative of one of the at least one key; challenge and configure the strong PUF source CSPS; and receive a quantized non-binary response in feedback of the strong PUF source CSPS;

a PUF control logic finite state machine CFSM configured to drive the adaptive control unit ACU, configured to:

receive a PUF mode operation to execute, first self-enrollment SE, then key rebuilding KR;

access to data representative of one-time programmable policy P_OTP;

write and read data of a data RAM D_RAM; and write and read a one-time programmable data D_OTP.

Figure 3:
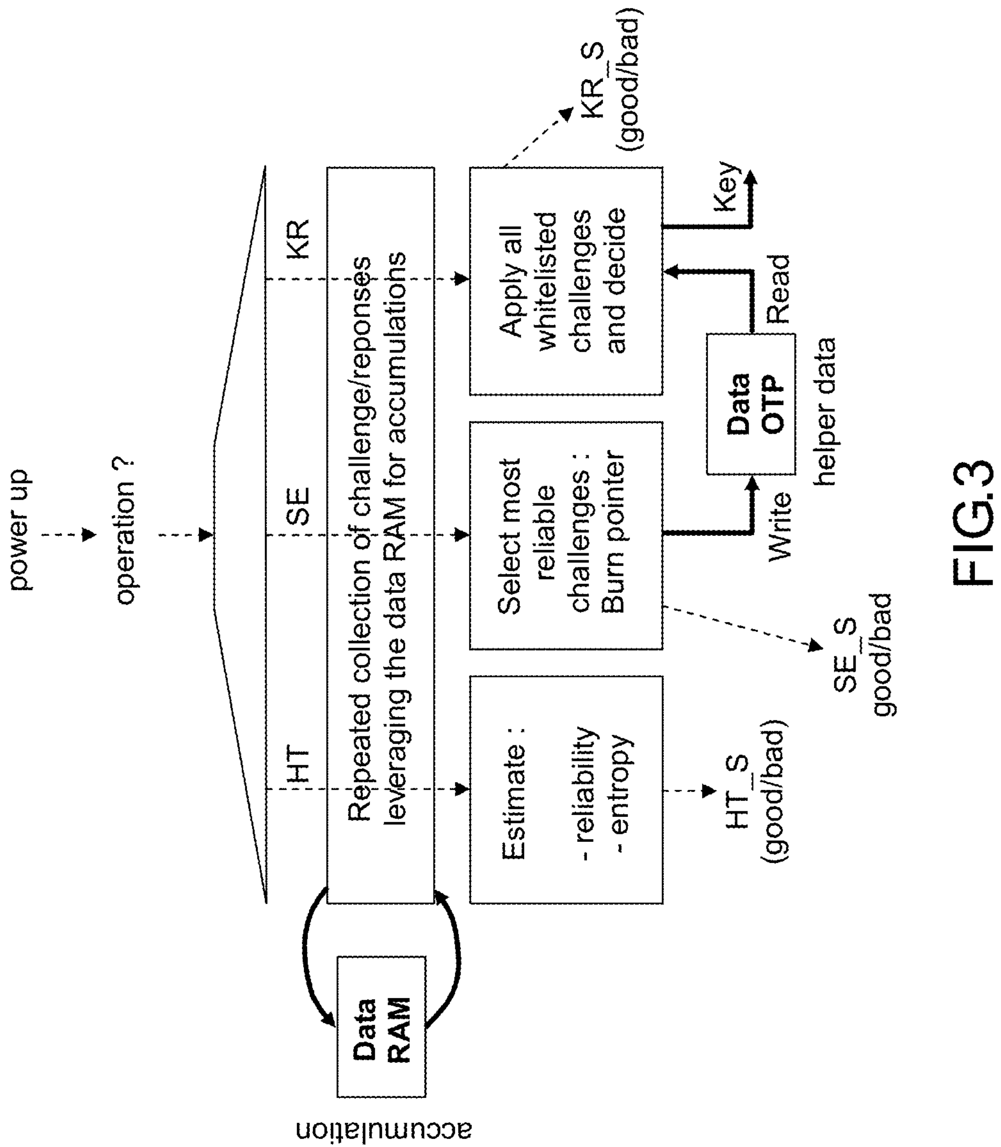
FIG. 3 schematically illustrates a PUF control logic finite state machine of an adaptive control system of a configurable strong PUF source of FIG. 2, according to an aspect of the invention.

FIG. 3 schematically illustrates a PUF control logic finite state machine of an adaptive control system of a configurable strong PUF source of FIG. 2, according to an aspect of the invention.

The PUF control logic finite state machine CFSM is configured to:

Access data RAM to make a repeated data collection of challenges/responses leveraging the data RAM D_RAM for accumulations;

if PUF mode operation received is self-enrollment SE, select the most reliable challenges having a reliability greater than a reliability threshold, deliver a self-enrollment status SE_S taking the value good or bad depending on whether the self-enrollment went successfully or not, according to the corresponding reliability being greater than the reliability threshold and the corresponding entropy being greater than an entropy threshold, and write whitelisted challenges having a good self-enrollment status SE_S in the one-time programmable data D_OTP; and if PUF mode operation received is key rebuilding KR, read the whitelisted challenges in the one-time programmable data D_OTP, apply all whitelisted challenged, decide the key bits using adaptive control by querying the strong bit until the entropy and reliability thresholds are surpassed, deliver a key rebuilding status KR_S taking the value good or bad depending on whether the self-enrollment went successfully or not, and deliver a key.

Optionally, the PUF control logic finite state machine CFSM could also be configured to:

if PUF mode operation received is health tests HT, estimate the reliability and the entropy of the at least one key, and deliver a health tests status HT_S taking the value good or bad depending on whether health tests are successful or not.

It is virtuous that a PUF-based key generation module enforces some access control over the operations. Typically, it makes no sense to rebuild a key when helper data are missing. An example of comprehensive policy is given in the table of FIG. 4 here-after. It is based on a monotonic increase of the life cycle (meaning that life cycle index can only be set to increase). Notice that this table can apply independently per PUF index. The OPT policy block is nonetheless optimal: some simple systems can work without any OTP policy.

We describe hereafter The possible and customary life cycle states and corresponding rights on PUF are hereafter described:

0: at BLANK state, the chips can be operated without restriction, which allows to hunt for bugs and characterize the technology. At this stage, some trial for trimming can be performed;

1: at FACTORY state, the PUF is ready to be enrolled, though, for security reasons, it shall not be leveraged to generate a key since helper data are not there yet;

2: at PROVISIONED state, the PUF can be used to rebuild a key;

3: at MISSION state, the rights are the same as PROVISIONED state. Note that the goal of MISSION state is not apparent here, but some other aspects can be managed, such as the capability to debug is restricted;

4: the RMA state aims at testing the chip capability without compromising its security. Therefore the PUF can be tested, but it is no longer possible neither to enroll nor to query the key;

5: The EOL state corresponds to the product decommissioning. Hence no operation is permitted, as any operation can be considered as an attack path.

The data RAM is a temporary location for the strong PUF to store training data. The data OTP is a permanent memory wherein the enrollment configuration (namely the helper data) is stored, once for all. In regular use-case, once the data OTP has been programmed (one also says "programmed" or "burnt"), enrollment is no longer possible, and only support operation is "key rebuilding".

The way the PUF is operated can take advantage of the adaptive control. For instance, as illustrated on FIG. 5, instead of deriving one key bit (indexed by i, where $1 \leq i \leq n$) per response, it is possible to perform two queries $c_i$ and $c'_i$ and determine one key bit based on the two corresponding responses $r_i$ and $r'_i$. Typically, $c'_i$ can be derived from $c_i$ by a deterministic function, termed "conjugate". This is illustrated on FIG. 5 for the rebuilding of bit i of the key. The data carried by wires in bold are bit-vectors, whereas data carried by thin wires are mere bits.

Such differential approach allows filtering out environmental variability (e.g., the V and T parameters in the PVTA space). It is for instance possible to use $c'_i = \neg c_i$ (complement, i.e., $\neg 0 = 1$ and $\neg 1 = 0$). Notice that V & T can span large intervals in practice, as for instance in AEC-Q100 [s4], where "grade 0" is meant to operate at ambient operating temperature range [−40° C., +150° C.].

The PUF control takes as input the two most important metrics of PUFs, namely:

1) reliability, and 2) entropy.

Those are prescribed setpoints for self-enrollment SE and key rebuilding KR commands. a setpoint is a target value to be reached by SE and KR commands, or that alternatively return a "failure" type of status. In the present invention a setpoint and a threshold are considered as equivalent: an operation is successful if the setpoint (or thresold) is met, otherwise an alarm is raised. The term "setpoint" is used to indicate that the "threshold" is a primary input, defined and set by the user.

The PUF control logic finite state machine CFSM stimulates the PUF and retrieves unquantized response. While the targeted metrics are not reached, the PUF is restimulated, e.g., with accumulation leveraging a "data RAM" or by tweaking "PUF configuration" input.

Regarding reliability, it is worthwhile to recall that the longer the interaction time with a delay-PUF, the better the obtained reliability. It is therefore fruitful to perform several queries in-a-row. For instance, in Tab. 2, one can visually see the increased reliability of deciding between one challenge (blue) versus another one (red) when the configuration parameter governing the number of clock periods increases. It is also apparent that the SNR increases as the number of clock periods increases. The number of queries can be adapted per challenge to get a uniform reliability across challenges.

Figure 6:
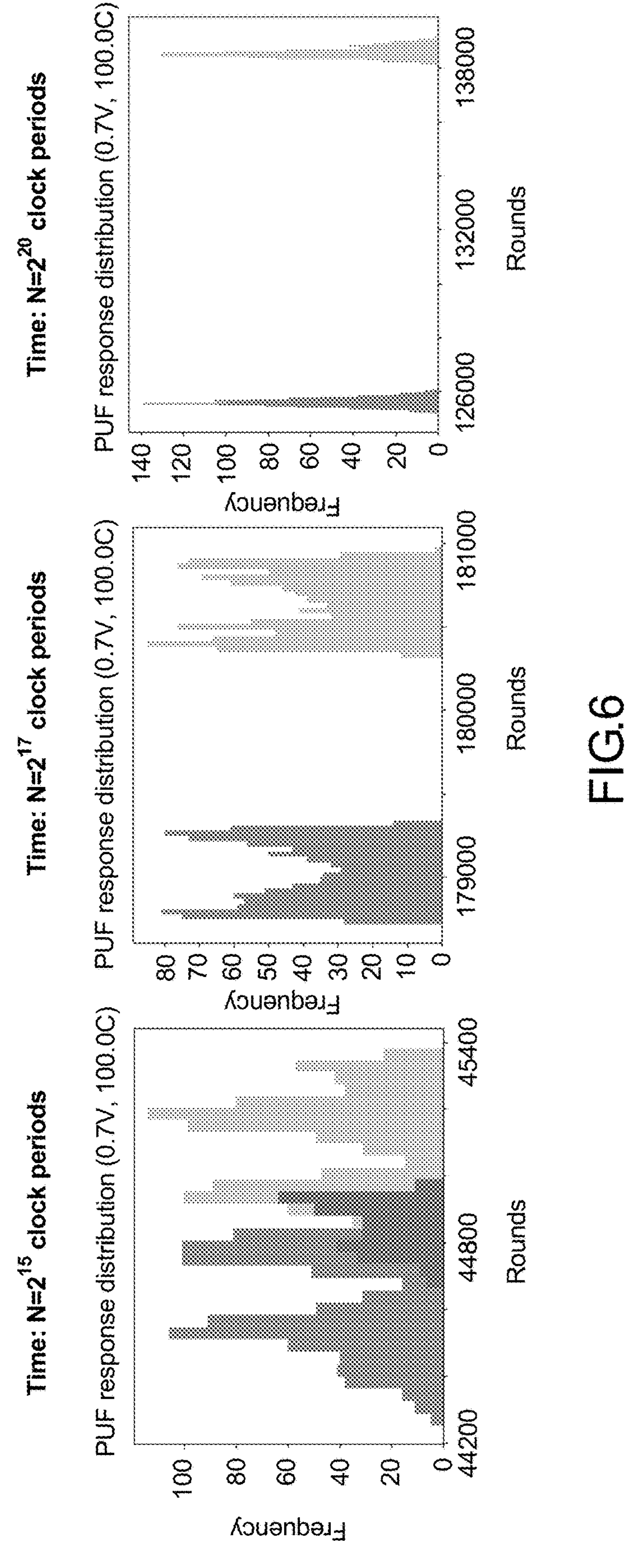
FIG. 6 schematically illustrates a visual representation of the reliability increase when interaction time with the strong PUF increases, according to an aspect of the invention.

The FIG. 6 is a visual representation of the reliability increase when interaction time (configurable parameter N) with the strong PUF increases.

Figure 7:
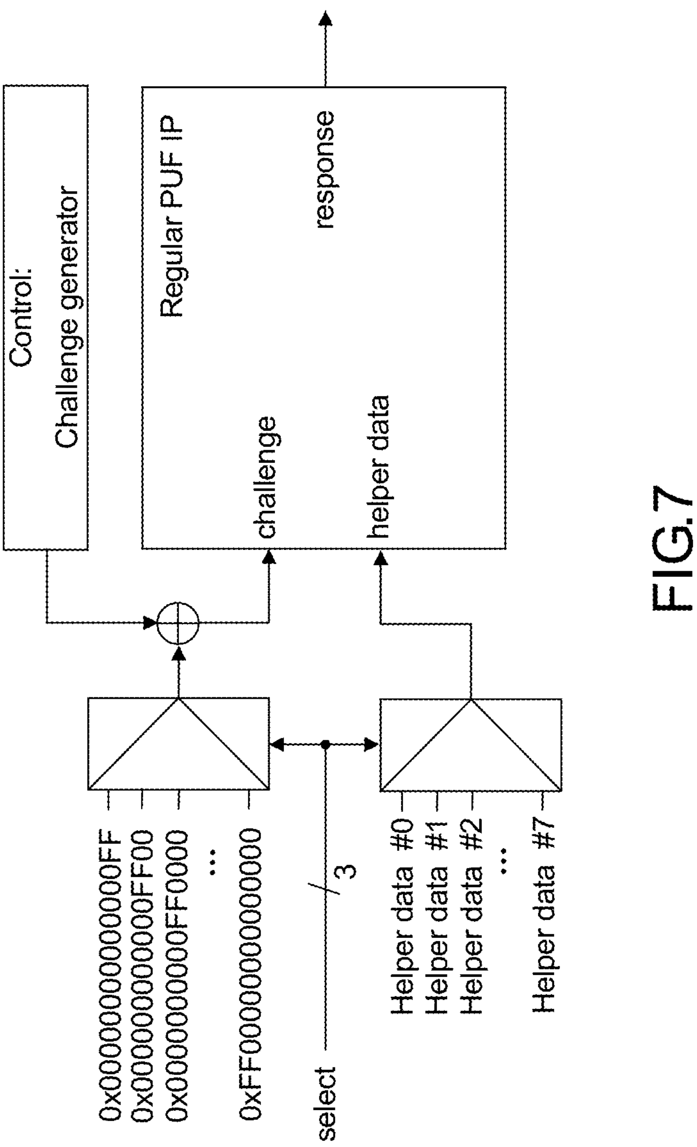
FIG. 7 schematically illustrates PUF diversification through selected challenges offset, on the example of 23-8-fold key diversification, according to an aspect of the invention.
Figure 8:
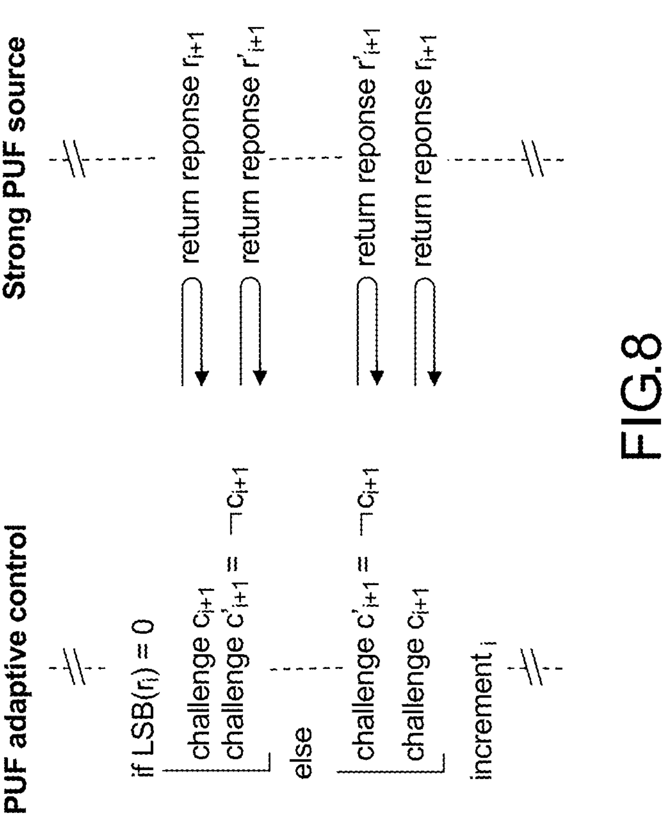
FIG. 8 schematically illustrates randomized order of LPUF queries to mitigate side-channel attacks, according to an aspect of the invention.

Another aspect related to key generation is the ability to enroll multiple keys. This is enabled by strong PUFs, in that the number of challenges in exponential in the size of the PUF. But it is also interesting to leverage related challenges to have the capability to obtain a related key, hence making it possible to revoke and re-enroll from a same "PUF source". Such a construct is possible using "translated" challenged (i.e., offset by a constant, as in coset codes), as shown on FIG. 7. A "coset code C' of a code C" is another code whereby all vectors in C' are translated The PUF adaptive control can leverage a randomization of the order in which challenges are applied, so as to mitigate the risk of side-channel attacks which would attempt to infer a relationship between a measured leakage (e.g., electromagnetic or power consumption observation) with the quantized bit-vector response value. This is explained in the interaction diagram of FIG. 7 which starts for key bit i "secure" rebuilding; recall we assume that $1 \leq i \leq n$. The order in which the pair of challenges ($c_i$ and $c'_i$) is randomized, without though resorting to an external TRNG. The randomization arises from the fact the least significant bit (LSB) does not convey meaningful information to derive the response value (since information is rather in the most significant bit).

The adaptive control can advantageously implement PUF response digitization that increase resistance against helper data manipulation, such as the use of non-linear metrics based on binary detection leveraging response distribution quartiles as described in the document U.S. Pat. No. 11,005,668B2.

Table of FIG. 9 recaps the benefits of using adaptive control. Recall that those benefits themselves rely on the fact that strong PUFs can be queried more than once (actually, ad libitum) within one power cycle.

The PUF can receive a configuration to allow more expressivity from the adaptive control module. For instance, the time given to the strong PUF to produce its response allows exploring a time versus reliability trade-off. This law (assuming jitter is IID) has already been illustrated on FIG. 6.

In a classical architecture, the PUF is a Loop-PUF as described in document U.S. Pat. No. 8,867,739 B2. Such PUF lets a free running loop oscillates during a fixed amount of time, and determines the number of rounds. Two such operations are realized under two related challenges, and the response is decided based on the pair of round values. It has been shown that when the "fixed amount of time" is measured by the system clock, some manipulation by the attacker can target the free running loop while the system clock is remaining steady. For this reason, structures where the "fixed amount of time" is measured by yet another free running loop have been proposed, in the field of True Random Number Generators (TRNGs) ("Towards an Oscillator Based TRNG with a Certified Entropy Rate", David Lubicz, Nathalie Bochard, IEEE Trans. Computers 64 (4): 1191-1200 (2015)). Another byproduct of this approach is that the resulting Loop-PUF (or delay-PUF in general) is more immune to dynamic noise since the measurement is differential (between the two loops).

Addressing all the limitations enumerated in the former section is the topic of our invention. It requires two building blocks, namely:

1 A configurable strong PUF source CSPS, meaning that it can be queried with arbitrarily chosen challenge and provide its answer, without the need to "restart" the chip between different queries; and 2 An adaptive PUF control unit ACU wrapping the strong PUF.

The solution we propose is that of any strong PUF, that can be operated in a secure environment by digital logic. The PUF can thus be:

- trained, in enrollment phase, leveraging a simple PUF entropy source device driver;
- trimmer, in provisioning phase, whereby the parameters to rightfully rebuild the same constant are fixed permanently in non-volatile memory (or even in OTP);
- queried, after any of the two aforementioned operations are performed.

As above recalled, PUF entropy source" is a core, which must be surrounded by supportive logic. The next subsections describe the invention, from a structural point of view and from a behavioral point of view.

Adaptive control of a PUF source implemented in logic, i.e., a controlling logic in HW or FW that feedbacks with the PUF (whereby weak PUFs have not such capability, as spawn only once upon power-up). The operation mode can take three values: self-enrollment SE, key rebuilding KR, or health tests HT. on FIG. 2, the wires that are fat are "buses" carrying vectors of bits (data), whereas the thin wires are control values. Also, parts in grey are optional. The strong PUF is fed with a configuration, such as the window N of loop measurement. The outputs are key (only valid when operation is key rebuilding KR) and status (there is a different status line as a function of the requested operation: HT_S signals whether the health tests are successful, SE_S indicates that the self-enrollment went fine, and KR_S informs that the key rebuilding as been appreciated as customers.

Present invention leverages a state, either ephemerally during a process of PUF operations (RAM is enough) or permanently across reboots (non-volatile memory, such as OTP, is needed). The OTP contains these pieces of information:

- Whitelist per PUF instance;
- Entropy & reliability setpoints;
- Life cycle for each PUF, including whether the PUF is enrolled (this is optional, since by leveraging this option, the PUF cannot be re-enrolled).

Figure 5:
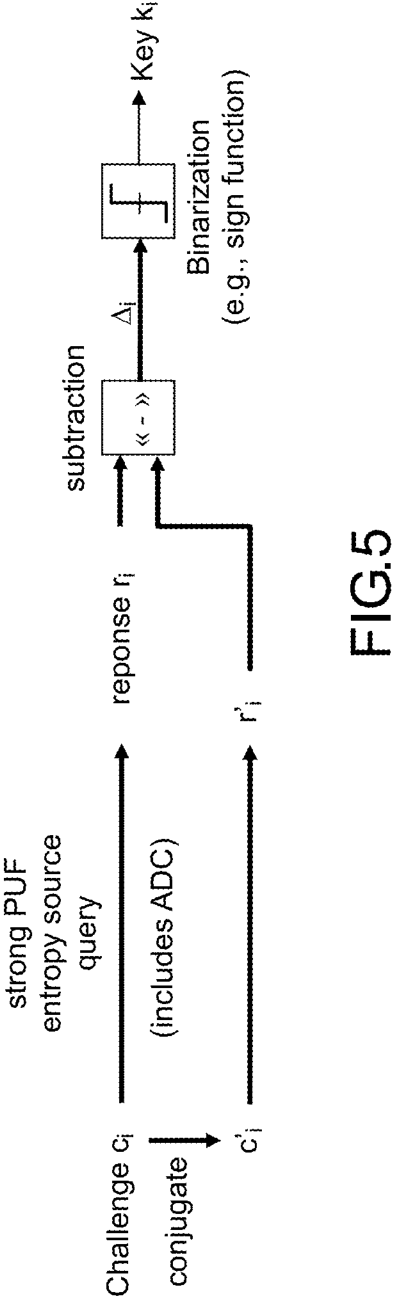
FIG. 5 schematically illustrates an example of key rebuilding process from two responses (two queries from two conjugate challenges), according to an aspect of the invention.

The behavior of the invention is captured on FIG. 5. At first, it is possible (optionally) to read the policy OTP. It contains the authorized operations per life cycle state of each PUF index (FIG. 4).

Then, the permitted operations are the broadly divided into two classes:

- update of the authorizations (request to alter the "policy OTP") execution of a PUF mode of operation, amongst HT, SE and KR.

The operations can generate two kinds of output:

- a status SE_S, KR_S, HT_S (for each of the three admissible operations SE, KR, HT), indicating whether the operations unfold nominally or not. There are three status signals, one for each admissible operation;
- a key value, in case the operation mandates a PUF "Key Rebuilding" mode of operation. When the operation is "Health Test" or "Self-Enrollment", the key Key delivered contains no meaningful operation.

The modes of operations are described thereafter:

HT: The health tests consist in checking that the strong PUF still behaves as per its specifications. It can be, for instance, as described in documents U.S. Pat. No. 10,855,476 B2 or U.S. Pat. No. 10,630,492 B2. Regarding the reliability testing, some challenges are repeatedly submitted to the PUF so as to assess how reproducing the answer is. This yields directly to BER or KER metrics under a given challenge. For a more thorough assurance in the metric, it is beneficial to leverage a stochastic model. In this respect, the same characterization shall be done for a multiplicity of challenges, so as to estimate both the noise and the technological dispersion. Combined, this results in an in situ estimation of the SNR. Regarding the entropy, it can be estimated by passing tests (e.g., NIST SP 800 22, for instance in bibliography section § 4 of SP 800-22 Rev. 1a. "A Statistical Test Suite for Random and Pseudorandom Number Generators for Cryptographic Applications", Andrew Rukhin et al. April 2010). Another approach is to exercise the PUF in parts, so as to check independence of PUF portions (approach of U.S. Pat. No. 10,630,492 B2). For more security, the health tests can be carried out on a subset of challenges which are not used to generate keys, as per the concept of "service challenge" described in U.S. Pat. No. 10,855,476 B2.

SE: The self-enrollment allows generating the helper data for a specified key. Let us illustrate the process in a situation where the helper data consist in whitelisting some challenges resulting in a reliable responses (or alternatively in blacklisting the complementary set of challenges, namely those resulting in the most unreliable responses). The self-enrollment mode of operation is (optionally) parameterized by a target reliability and a target entropy. Let us detail how present innovative FSM can achieve this. In terms of reliability, the adaptive PUF control selects the strong PUF entropy source configuration in such a way the target reliability is overcome. Such setpoint pertains to the helper data that are stored in the data OTP. In terms of entropy, the adaptive control leverages the stochastic model to determine the set of challenges to be used for a given PUF index. It can be interesting to characterize the PUF in multiple corners (some industrial products shall work in tens of corners), or also in safe versus attack scenarios, or even merely in various conditions as supported by the chip DVFS strategy. A noteworthy advantage of present self-enrollment process is that the helper data never leave the PUF IP, thereby making "helper data" manipulation attacks impossible by design (this is not of case of weak PUFs, where the helper data is entrusted to a Secure Device Management external of the PUF (Intel® Agilex™ Device Security User Guide.)).

KR: The "key rebuilding" operation recovers the set of challenges to be used to generate afresh each key bit (or symbol, in case of HoA) from the data OTP. Obviously, if the selected PUF has not been previously enrolled with a self-enrollment operation, the KR operation fails. The KR operation leverages the target reliability/entropy to devote less or more time to rebuild the key. Indeed, if one key bit is not rebuilt with sufficient confidence, it can be required until the target reliability is overcome. This follows a similar process as already put in place during SE. Regarding the respect of the entropy; this is ensured already by the selection of challenges operated upon SE.

The FSM behavior represented on FIG. 5 is implicitly occurring repetitively: once one operation has been processed, another operation can be accepted and subsequently executed, and so on. This enable interesting scenarios whereby the chip is powered-up, then checked in terms of health test, and if satisfactory, enrolled. All those operations being chained without any need for reboot or power up cycle.

Notice that the HT mode is optional. The real constraint is to have SE ready. In this case, KR can start. The indications of the HT can guide the system-level user whether SE or KR operations are reasonable, in their "threat context".

The HT mode of operation can also turn out to be used as a sensor. In this alternative mode, the HT is not meant to check for the PUF correct behavior but for the overall host chip integrity. The PUF is designated as an opportunistic sensor.

The SE operation can leverage the adaptive control simply by chaining (executing the characterization) candidate challenge per candidate challenge. But it is also possible to determine the most suitable strong PUF entropy source configuration interleaved with SE process. The configuration can be same across all changes or determined per challenge. The pseudo code for the first case is given here-after:

```
// Extraction of the Delta values (difference between responses
for a challenge and its conjugate
  set configuration to the most relaxed one (e.g., longest
  interaction time for the
  best reliability
  for i in {1,...,m}: // m is for instance equal to 2*n
  (twice the value of n)
    Delta_i = response(chall_i) - response(conjugate(chall_i))
  Sort Delta as per values of {\Delta_i|, 1≤i≤m}
  Whitelist is composed of the n largest values
// Match the reliability
  set configuration to the less relaxed one
  reliability = 0
  for i in {1,...,n}: // is the number of whitelisted challenges
    while( reliability(challenge_i) < reliability_target ):
      set configuration to the next value
// Helper data is complete
  Store helper data as the whitelist and the value
 of configuration
```

In the second case, the pseudo-code is given below:

```
// Extraction of the Delta values (difference between
responses for a challenge and
its conjugate
  set configuration to the most relaxed one (e.g., longest
  interaction time for the
  best reliability
  for i in {1,...,m}: // m is for instance equal to 2n
    Delta_i = response(chall_i) - response(conjugate(chall_i))
  Sort Delta as per values of {\Delta__i|, 1≤i≤m}
  Whitelist is composed of the n largest values
// Match the reliability
  for i in {1,...,n}: // is the number of whitelisted challenges
    set configuration to the less relaxed one
    reliability = 0
    while( reliability(challenge_i) < reliability_target ):
      set configuration to the next value
    configuration_i = configuration // Saving the
    configuration for chall i
// Helper data is complete
  Store helper data as the whitelist and the corresponding
  configurations
```

In those two pseudo-codes, the reliability function relates the value of Delta_i (denoted $\square_i$ on FIG. 5) to the reliability, as given in input on FIG. 3. One such relation is given in "An Improved Analysis of Reliability and Entropy for Delay PUFs", Alexander Schaub, Jean-Luc Danger, Sylvain Guilley, Olivier Rioul. DSD 2018:553-560, Lemma 1, page 554]).

Also, in both those pseudo-codes, the retries in the while loop can consist not in a restart from scratch, but in an incremental accumulation of the value of $\square_i$ so as to leverage the LLN.

The flexibility is explained on FIG. 10, wherein pros and cons are explicit. Basically, a global configuration will reduce the size of the helper data (one configure for all challenges), whereas a configuration per challenge optimize the rebuilding speed (at the expense of the helper data size).

Accordingly, the KR step can be adaptive to either the off-line pre-characterized value of configuration(s) or to the on-line determined one. The two pseudo-codes that follow illustrate this process of KR.

```
// Key rebuilding considering the off-line precharacterized
values of configurations
  for i in {1,...,n}: // is the number of whitelisted challenges
  set configuration to the global stored one (or specific to this chall)
  Delta_i = response(chall_i) - response(conjugate(chall_i))
  if( Delta_i > 0):
    key_i = 1
  else:
    key_i = 0
// Key rebuilding considering the on-line determined values
of configurations
  set configuration to the global stored one (or specific to this chall)
  while( reliability( reliability(challenge_i) < reliability_target )):
  set configuration to the next value
  Delta_i = response(chall_i) - response(conjugate(chall_i))
  if( Delta_i > 0):
    key_i = 1
  else:
    key_i = 0
```

Present invention presents the following advantages:

The adaptive control allows to make up at post-silicon stage of likely unpredictable silicon behavior, such as dynamic noise and exact amount of process dispersion Perturbation attacks can be detected by checking for PUF correct key rebuilding leveraging "service challenges", as per U.S. Pat. No. 10,855,476 B2 Self-enrollment under a given key, re-enrollment under another key-under the control of life cycles, in case an enrollment must be locked PUF key revokation, enabling future-proof usage of master keys with the high security of PUFs Health test before use and periodic tests, as required by security standards such as NIST FIPS 140-3

Soft reboot of the PUF rebuilt key, i.e., suitability for "safety application" The challenges are not exposed to the host, hence no ML/AI attacks ("Modeling attacks on physical unclonable functions", Ulrich Rührmair, Frank Sehnke, Jan Sölter, Gideon Dror, Srinivas Devadas and Jürgen Schmidhuber, CCS 2010:237-249.) are possible (by design) Enables more flexible characterizations: in all corners/under attack/etc.

The invention claimed is:

1. An adaptive control system of a configurable strong PUF source (CSPS) configured to deliver a self-enrollment status (SE_S), a key (K) and a key rebuilding status (KR_S), comprising:

an adaptive PUF control unit (ACU) configured to:

receive information of entropy of at least one key, reliability of the at least one key and PUF index representative of one of the at least one key;

challenge and configure the strong PUF source (CSPS); and receive a quantized non-binary response in feedback of the strong PUF source (CSPS);

a PUF control logic finite state machine (CFSM) configured to drive the adaptive control unit (ACU), configured to:

receive a PUF mode operation to execute, first self-enrollment (SE), then key rebuilding (KR);

access to data representative of one-time programmable policy (P_OTP);

write and read data of a data RAM (D_RAM); and write and read a one-time programmable data (D_OTP).

2. The adaptive control system of a strong PUF source according to claim 1, wherein the PUF control logic finite state machine (CFSM) is configured to:

access data RAM to make a repeated data collection of challenges/responses leveraging the data RAM (D_RAM) for accumulations;

if PUF mode operation received is self-enrollment (SE), select the most reliable challenges having a reliability greater than a reliability threshold, deliver a self-enrollment status (SE_S) taking the value good or bad depending on whether the self-enrollment went successfully or not, according to the corresponding reliability being greater than the reliability threshold and the corresponding entropy being greater than an entropy threshold, and write whitelisted challenges having a good self-enrollment status (SE_S) in the one-time programmable data (D_OTP); and if PUF mode operation received is key rebuilding (KR), read the whitelisted challenges in the one-time programmable data (D_OTP), apply all whitelisted challenged, decide the key bits using adaptive control by querying the strong bit until the entropy and reliability thresholds are surpassed, deliver a key rebuilding status (KR_S) taking the value good or bad depending on whether the self-enrollment went successfully or not, and deliver a key (Key).

3. The adaptive control system of a strong PUF source according to claim 2, wherein the PUF control logic finite state machine (CFSM) is also configured to:

if PUF mode operation received is health tests (HT), estimate the reliability and the entropy of the at least one key, and deliver a health tests status (HT_S) taking the value good or bad depending on whether health tests are successful or not.

4. The adaptive control system of a strong PUF source according claim 1, wherein the one-time programmable data (D_OTP) contain:

a whitelist per PUF instance;

entropy and reliability thresholds; and a life cycle for each PUF.

5. The adaptive control system of a strong PUF source according to claim 2, wherein the one-time programmable data (D_OTP) contain a life cycle for each PUF, including whether the PUF is enrolled.

6. A method to deliver a self-enrollment status (SE_S), a key (K) and a key rebuilding status (KR_S), the method being implemented by an adaptive control system of a strong PUF source, the method comprising:

receiving information of entropy of at least one key, reliability of the at least one key and PUF index representative of one of the at least one key;

challenging and configure the strong PUF source (CSPS); and receiving a quantized non-binary response in feedback of the strong PUF source (CSPS);

implemented in an adaptive PUF control unit (ACU), and the method comprising:

receiving a PUF mode operation to execute, first self-enrollment (SE), then key rebuilding (KR);

accessing to data representative of one-time programmable policy (P_OTP);

writing and reading data of a data RAM (D_RAM);

writing and reading a one-time programmable data (D_OTP);

implemented in a PUF control logic finite state machine (CFSM) configured to drive the adaptive control unit (ACU).

7. A computer program product comprising instructions for carrying out the steps of the method of claim 6.

* * * * *